(12) United States Patent
Larsson et al.

(10) Patent No.: US 9,930,622 B2
(45) Date of Patent: Mar. 27, 2018

(54) POWER CONTROL OF UPLINK CONTROL CHANNELS IN HETEROGENEOUS NETWORKS

(71) Applicant: Telefonaktiebolaget L M Ericsson (publ), Stockholm (SE)

(72) Inventors: Erik Larsson, Uppsala (SE); Michael Samuel Bebawy, San Jose, CA (US); Peter Von Wrycza, Stockholm (SE); Eric Wang YP, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

(21) Appl. No.: 14/378,052

(22) PCT Filed: May 9, 2014

(86) PCT No.: PCT/SE2014/050571
§ 371 (c)(1),
(2) Date: Aug. 11, 2014

(87) PCT Pub. No.: WO2014/182236
PCT Pub. Date: Nov. 13, 2014

(65) Prior Publication Data
US 2015/0257111 A1 Sep. 10, 2015

Related U.S. Application Data

(60) Provisional application No. 61/822,030, filed on May 10, 2013.

(51) Int. Cl.
*H04W 36/00* (2009.01)
*H04W 52/24* (2009.01)
(Continued)

(52) U.S. Cl.
CPC ......... *H04W 52/241* (2013.01); *H04W 52/12* (2013.01); *H04W 52/146* (2013.01);
(Continued)

(58) Field of Classification Search
CPC .................................................. H04W 52/241
See application file for complete search history.

(56) References Cited

U.S. PATENT DOCUMENTS

2008/0200200 A1* 8/2008 Usuda ................. H04W 52/325
455/522
2011/0170496 A1 7/2011 Fong
(Continued)

FOREIGN PATENT DOCUMENTS

| WO | 2010091425 A2 | 8/2010 |
|---|---|---|
| WO | 2012050506 A1 | 4/2012 |
| WO | 2013046026 A1 | 4/2013 |

*Primary Examiner* — Justin Lee
(74) *Attorney, Agent, or Firm* — Murphy, Bilak & Homiller, PLLC

(57) ABSTRACT

A network node of a wireless communication network serves a wireless device that is transmitting one or more uplink channels to each of a serving cell and at least one non-serving cell. Inner-loop power control, ILPC, commands are sent (420) to the wireless device in such a way that only ILPC commands transmitted by the serving cell affect the power of one or more control channels transmitted by the wireless device to the serving cell. In addition, a power offset for a data channel transmitted by the wireless device to the at least one non-serving cell is adjusted (430), so as to compensate for an uplink-downlink power imbalance among the serving cell and the at least one non-serving cell.

34 Claims, 6 Drawing Sheets

(51) Int. Cl.
*H04W 52/40* (2009.01)
*H04W 72/04* (2009.01)
*H04W 52/12* (2009.01)
*H04W 52/14* (2009.01)
*H04W 52/32* (2009.01)
H04W 52/08 (2009.01)
H04W 52/28 (2009.01)
H04W 84/04 (2009.01)

(52) U.S. Cl.
CPC ......... *H04W 52/325* (2013.01); *H04W 52/40* (2013.01); *H04W 72/042* (2013.01); *H04W 52/08* (2013.01); *H04W 52/286* (2013.01); *H04W 84/045* (2013.01)

(56) References Cited

U.S. PATENT DOCUMENTS

| | | |
|---|---|---|
| 2012/0213092 A1 | 8/2012 | Sun et al. |
| 2012/0224520 A1* | 9/2012 | Ke .................. H04W 52/12 370/311 |
| 2014/0113675 A1* | 4/2014 | Scholand .......... H04W 52/16 455/522 |
| 2016/0029388 A1* | 1/2016 | Ali .................. H04W 72/1278 370/329 |
| 2016/0057715 A1* | 2/2016 | Wang ............... H04W 52/40 455/522 |

\* cited by examiner

POWER CONTROL OF UPLINK CONTROL CHANNELS IN HETEROGENEOUS NETWORKS

TECHNICAL FIELD

The present disclosure is generally related to wireless communication networks and is more particularly related to power control of uplink control channels during soft-handover.

BACKGROUND

Fast closed-loop power control and soft handover (SHO), also referred to as macro diversity, are essential features of the $3^{rd}$-Generation Partnership Project (3GPP) standards for Wideband Code-Division Multiple (WCDMA) systems generally and of the Enhanced Uplink (EUL) features in particular. EUL is often referred to as High-Speed Uplink Packet Access (HSUPA), and is generally coupled with High-Speed Downlink Packet Access (HSDPA); these two high-speed packet data capabilities are collectively known as High-Speed Packet Access (HSPA).

In WCDMA systems, it is the Radio Network Controller (RNC) that is in control of reconfigurations, which implies rather long delays for performing a cell change. During SHO, the UE is power-controlled by the best uplink cell, i.e., by the cell that best receives the uplink transmissions from the UE.

FIG. 1 illustrates a traditional HSPA deployment scenario with two nodes having a similar transmit power level. Ideally, a mobile terminal ("user equipment," or "UE," in 3GPP terminology) moving from a serving cell towards a non-serving cell would enter the SHO region at point A. This is referred to as event 1A in 3GPP documentation. At point B, a serving cell change would occur, i.e., the non-serving cell becomes the serving cell and vice-versa. This is event 1D in 3GPP terms. At point C, the UE would leave the SHO region. 3GPP documentation refers to this as event 1B.

Since the nodes in FIG. 1 are assumed to have roughly the same transmit power, the optimal downlink (DL) and uplink (UL) cell borders will coincide, i.e., the path loss from the UE to the two nodes will be equal at point B. Hence, in an ideal setting and from a static (long-term fading) point of view, the serving cell will always correspond to the best uplink. However, in practice, due to imperfections in network control (e.g., reconfiguration delays) and fast fading, the UE might sometimes be power controlled by the non-serving cell during SHO. In such a case, there might be problems in receiving control channel information in the serving cell, due to the weaker link between the serving cell and UE. In some cases, it is essential that the uplink control channel transmissions are received by the serving cell. For example, the High-Speed Dedicated Physical Control Channel (HS-DPCCH) transmitted by the UE and scheduling information must be received in the serving cell.

Possible remedies to this problem include increasing the gain factors, by means of Radio Resource Control (RRC) signaling, or using repetitive transmissions, to improve the chances that the serving cell reliably receives the control channel information transmitted by the UE. A conventional remedy is simply to rely on retransmissions triggered by Hybrid Automatic-Repeat Request (HARQ) processes. However, while possible imbalances between the uplink and downlink in a traditional deployment are usually caused by fast fading, other factors can make the imbalance more pronounced in other scenarios, such as heterogeneous network deployments. In these scenarios, conventional retransmission techniques might not be adequate. Accordingly, improved techniques for handling uplink control channels in a SHO scenario are needed.

SUMMARY

Embodiments of the techniques disclosed herein and detailed below may be used to ensure reliable reception of essential uplink control information in relevant nodes when the communication link is weak, in scenarios where another uplink link in the active set is stronger and would normally dictate the power control mechanism.

An example method according to some embodiments of these techniques is implemented in at least one network node of a wireless communication network serving a wireless device, where the wireless device is transmitting one or more uplink channels to each of a serving cell and at least one non-serving cell. According to this example method, inner-loop power control (ILPC) commands are sent to the wireless device in such a way that only ILPC commands transmitted by the serving cell affect the power of one or more control channels transmitted by the wireless device to the serving cell. In addition, a power offset for a data channel transmitted by the wireless device to the at least one non-serving cell is adjusted, so as to compensate for an uplink-downlink power imbalance among the serving cell and the at least one non-serving cell. In some embodiments, these operations are performed in response to determining that a power-imbalance is or may be present, based on a triggering condition. The triggering condition may be or include, for example, that: the wireless device has entered soft handover; the wireless device has entered soft handover involving cells having different transmit powers; one or more control channel qualities at the serving cell becomes bad, compared to a predetermined reference level; a data channel quality at the serving cell becomes bad, compared to a predetermined reference level; the estimated SIR or other signal quality measure at the serving cell is below a target level for longer than a predetermined period of time; a large link imbalance between the wireless device and the serving cell and the wireless device and the at least one non-serving cell is detected; and/or the wireless device sends a message to the network, the message indicating a link imbalance.

In some embodiments, ILPC commands are sent in such a way that only "UP" Transmit Power Control (TPC) commands are sent to the wireless device from the at least one non-serving cell, while "UP" and "DOWN" TPC commands are selectively sent to the wireless device from the serving cell to control the power of one or more control channels transmitted by the wireless device to the serving cell. In other embodiments, an active set for the wireless device is configured so as to include only the serving cell, so that an ILPC function in the wireless device responds only to TPC commands transmitted by the serving cell. In still other embodiments, the wireless device is otherwise configured to ignore TPC commands transmitted by the at least one non-serving cell. In some embodiments, the example method is implemented at least partly in a Radio Network Controller (RNC), which controls the serving cell and/or at least one non-serving cell to send the ILPC commands in such a way that only ILPC commands transmitted by the serving cell affect the power of one or more control channels transmitted by the wireless device to the serving cell.

In some embodiments, the adjusting of a power offset discussed above comprises adjusting a power offset for an uplink packet data channel. This uplink packet data channel may be an E-DCH Dedicated Physical Data Channel (E-DPDCH), for example. In some embodiments, a signal-to-interference ratio (SIR), signal-to-interference-plus-noise ratio (SINR) or other signal quality measure is estimated for an uplink control channel in the at least one non-serving cell, and the power offset is calculated based on a difference between the estimated signal quality measure and a control channel signal quality target or setpoint.

In some embodiments, the power offset to the wireless device is sent to the wireless device via a new reference gain factor. In others, the power offset to the wireless device is sent to the wireless device via a change in a serving grant. In some embodiments, the power offset is sent to the wireless device using high-level signaling, e.g., Radio Resource Control (RRC) signaling, while in others the power offset is sent to the wireless device using physical layer signaling, such as via a high-speed shared control channel (HS-SCCH) order. A combination of two or more of these approaches may be used.

Other embodiments of the techniques disclosed herein include apparatus configured to carry out one or more of the methods summarized above. For example, an example network node apparatus includes a radio transceiver associated with a cell and configured to communicate with one or more wireless devices served by the first cell, and one or more processing circuits. These one or more processing circuits are adapted to configure a wireless device that is transmitting one or more uplink channels to the first cell and to at least one non-serving cell to respond to ILPC commands sent to the wireless device in such a way that only ILPC commands transmitted by the first cell affect the power of one or more control channels transmitted by the wireless device to the first cell. The processing circuits are further adapted to adjust a power offset for a data channel transmitted by the wireless device to the at least one non-serving cell so as to compensate for an uplink-downlink power imbalance among the first cell and the at least one non-serving cell. The several variations of the example method summarized above and detailed below are applicable to this example apparatus as well.

Still other embodiments include a wireless communication system that includes a serving cell transceiver associated with a serving cell and configured to receive at least one uplink channel from a wireless device served by the serving cell, one or more non-serving cell transceivers, each associated with a non-serving cell and configured to receive at least one uplink channel from the wireless device, simultaneously with said serving cell transceiver receiving an uplink channel from the wireless device, and one or more processing circuits associated with one or more of the serving cell transceiver, the one or more non-serving cell transceivers, and a radio network controller. The processing circuits are adapted to control the serving cell transceiver and the one or more non-serving cell transceivers to send ILPC commands to the wireless device in such a way that only ILPC commands transmitted by the serving cell affect the power of one or more control channels transmitted by the wireless device to the serving cell, and to adjust a power offset for a data channel transmitted by the wireless device to the at least one non-serving cell so as to compensate for an uplink-downlink power imbalance among the serving cell and the at least one non-serving cell.

Additional details of these and other embodiments are provided in the detailed description that follows.

DETAILED DESCRIPTION

Figure 1:
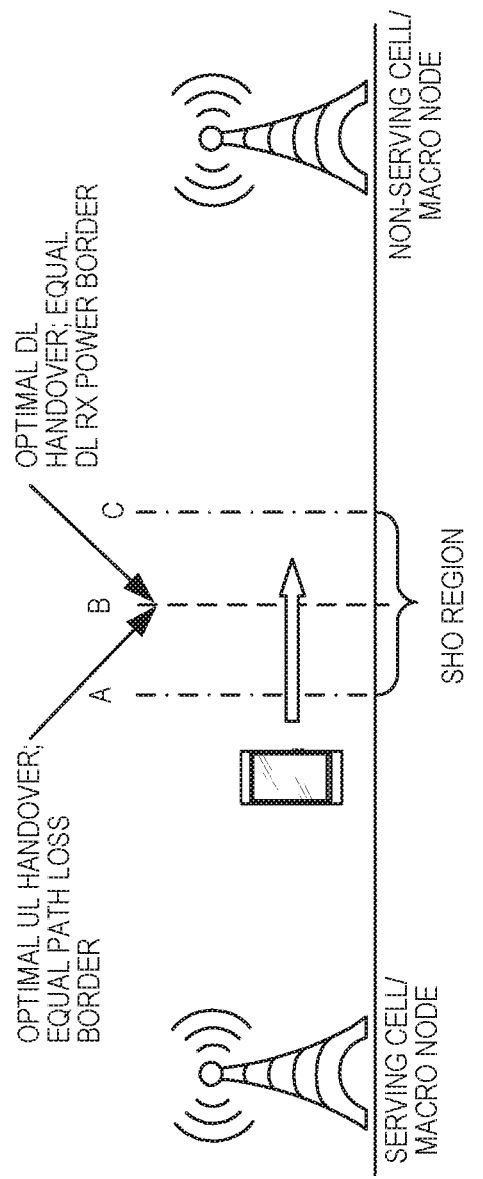
FIG. 1 illustrates soft-handover (SHO) operation for High-Speed Packet Access (HSPA) in a traditional macro deployment.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry, including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology from High Speed Packet Access (HSPA), as standardized by the 3GPP, has been used in this disclosure to exemplify the embodiments, this should not be seen as limiting the scope of the techniques to only the aforementioned system. Other wireless systems that utilize soft handover and/or that utilize heterogeneous networks where a mobile terminal communicates simultaneously with two or more radio access nodes may also benefit from exploiting the ideas covered within this disclosure. Thus, terms like "NodeB" and "UE" as used herein should be understood to refer more broadly to base stations (or radio access nodes) and mobile terminals, respectively, where "mobile terminal" should be understood to encompass end-user and end-application wireless devices such as mobile telephones, smartphones, wireless-enabled tablets or personal computers, wireless machine-to-machine units, and the like. Similarly, while specific channels described in 3GPP standards are referred to herein, the disclosed techniques should be understood as applicable to similar channels in other wireless systems.

3GPP members are currently developing specifications for the deployment of so-called heterogeneous networks in the Universal Mobile Telecommunications System (UMTS) context. Deployment of low-power nodes (LPNs) is seen as a powerful tool to meet the ever-increasing demand for mobile broadband services. A LPN may correspond, for example, to a remote radio unit (RRU), a pico base station, or micro base station, allowing the expansion of network capacity in a cost-efficient way. A network consisting of traditional macro NodeBs as well as LPNs is referred to as a heterogeneous network. Two examples of use-cases for heterogeneous network deployment that may be envisioned are to fill coverage holes and to enhance capacity in localized traffic hotspots.

Figure 2:
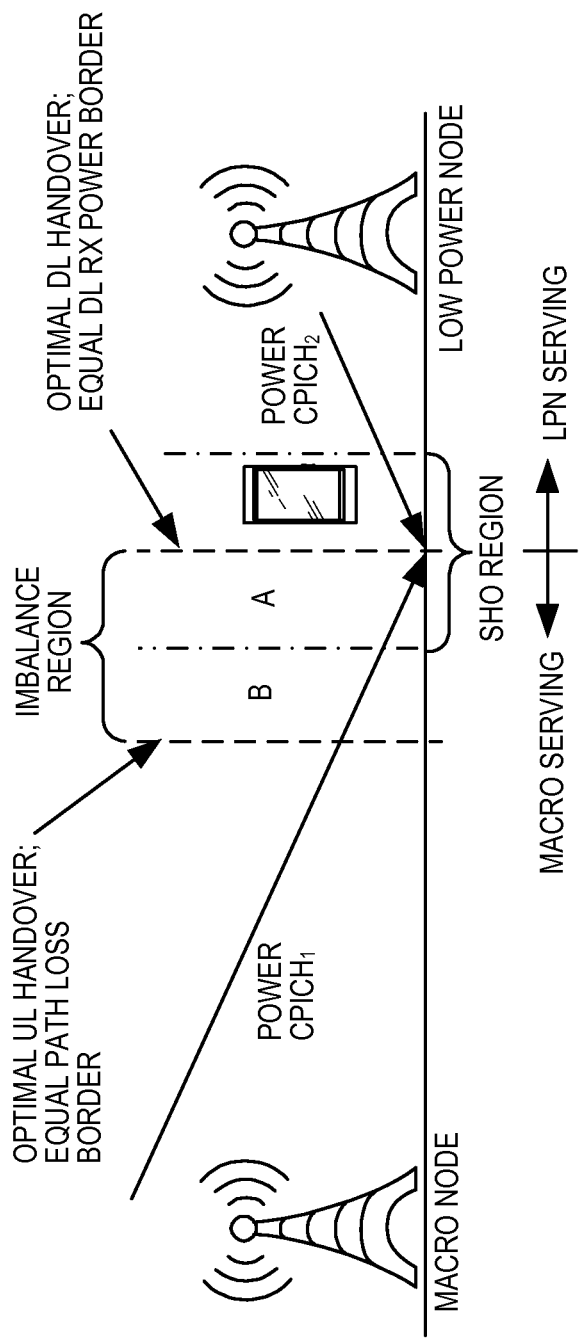
FIG. 2 illustrates SHO operation for HSPA in a heterogeneous deployment.

Since the LPNs and macro NodeBs in a heterogeneous network have different transmit powers, the uplink (UL) and downlink (DL) cell borders will not necessarily coincide. An example of this is when a UE has a smaller uplink path loss to the LPN, while the strongest received power is from the macro NodeB. In such a scenario, the UL is better served by the LPN, while the DL is provided by the serving macro NodeB. This is shown in FIG. 2. As seen in FIG. 2, the optimal uplink handover point, which is at the point at which there is an equal path loss to each node, is approximately halfway between the two nodes. However, the optimal downlink handover point, which is the point at which the power levels for received downlink signals (e.g., the common pilot channels, or CPICHs) are equal, is closer to the LPN, since the LPN's transmit power is lower.

The region between the equal path loss border and equal downlink received power border is referred to as an imbalance region. In this region, some fundamental problems may be encountered. For example, referring to FIG. 2, a UE at position A would have the Macro Node as the serving cell, but would be power controlled towards the LPN. Due to this uplink/downlink (UUDL) imbalance, the uplink towards the serving macro node could be very weak, which means that important control information, such as scheduling information or HS-DPCCH, might not be reliably decoded in the serving cell.

In contrast, a UE at position B would have the Macro Node as the serving cell, and would be power controlled towards the macro node as well. However, because of the UL/DL imbalance, the UE in this case can cause excessive interference at the LPN. Furthermore, in this scenario it may be impossible to fully utilize the benefits of macro offloading towards the LPN.

Figure 3:
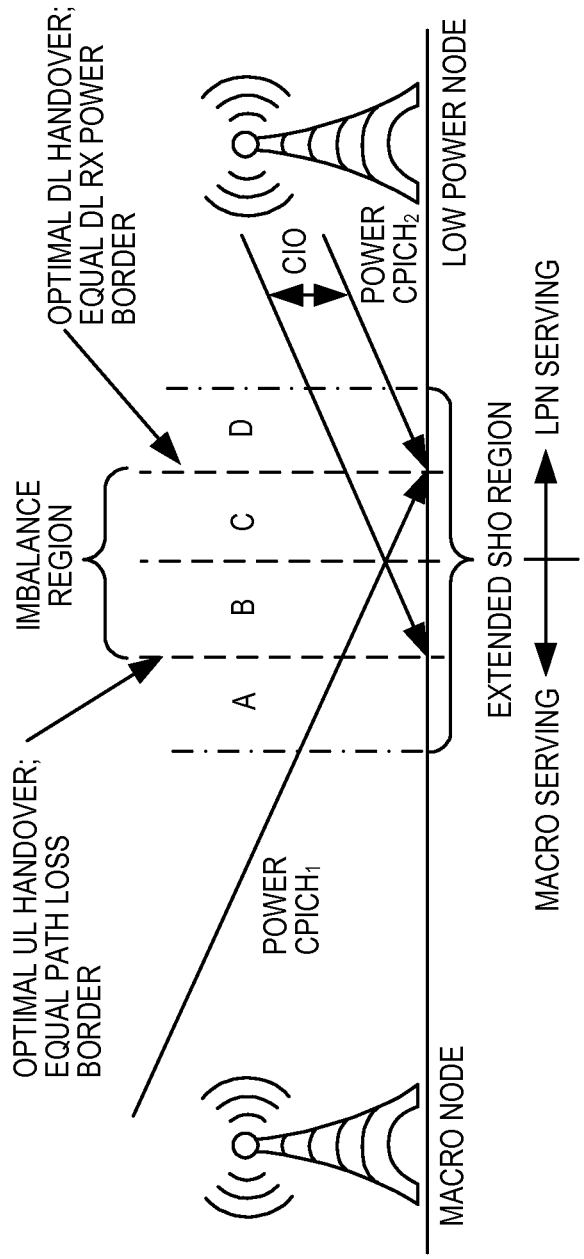
FIG. 3 depicts SHO operation for HSPA in a heterogeneous deployment with range extension.

One way of addressing these problems is to utilize the available cell selection offset parameters that are managed by the Radio Network Controller (RNC). By tuning the Cell Individual Offset (CIO) parameter, for example, the handover border can be shifted towards the optimal UL border. Similarly, the IN_RANGE and OUT_RANGE parameters can be adjusted in order to extend the SHO region. The effects of these adjustments are illustrated in FIG. 3.

The RNC-based adjustments described above are beneficial from a system performance point of view, but some difficulties remain. Remaining problem scenarios include the following, which are described in reference to FIG. 3:

Scenario 1—A UE in position A may experience a poor downlink signal from the non-serving LPN. This can complicate a reliable detection of uplink-related downlink channels transmitted by the LPN, such as the E-DCH HARQ Acknowledgement Indicator Channel (E-HICH) and the Fractional Dedicated Physical Channel (F-DPCH).

Scenario 2—A UE in position B has the macro as serving cell but is (in general) power controlled towards the LPN. As a result, the uplink signal towards the serving cell might be weak, thereby complicating a reliable reception of control channel information at the serving cell.

Scenario 3—A UE in position C is served by the LPN. However, its downlink signal might be poor, thereby complicating a reliable reception of control information, such as the High-Speed Shared Control Channel (HS-SCCH) and the E-DCH Absolute Grant Channel (E-AGCH).

Scenario 4—A UE in position D might experience poor uplink reception by the non-serving macro cell.

To maximize the potential gains provided by range extension, the problems associated with the different scenarios above need to be solved. This will allow not only the optimization of system performance, but will also improve the link quality for UEs experiencing severe degradation in uplink or downlink performance. The techniques disclosed herein include several different means for boosting uplink control channels when the communication link is weak. These techniques may be especially useful for addressing Scenarios 2 and 4 as listed above, for example.

The techniques disclosed herein may be used to ensure reliable reception of essential uplink control information in relevant nodes when the communication link is weak, in scenarios where another uplink link in the active set is stronger and would normally dictate the power control mechanism. One benefit of the disclosed techniques is that they can be addressed to legacy users, i.e., to mobile terminals that are compliant only to standards that already exist.

One aspect underlying several of the disclosed techniques is that the serving cell is allowed to exclusively dictate the inner-loop power control (ILPC) commands, even when it does not correspond to the strongest uplink. This approach ensures good signal reception quality in the serving cell. However, preventing non-serving cells from impacting the Transmit Power Commands (TPC) may cause excessive interference in non-serving cells, especially when the UL/DL imbalance is severe. To overcome this drawback, the power offsets for the power hungry E-DCH Dedicated Physical Data Channel (E-DPDCH) are reduced. Essentially, the E-DPDCH power offsets are reduced, such that the total E-DPDCH power remains roughly the same in the LPN regardless of the magnitude of the UUDL imbalance. Hence, in the WCDMA context, the techniques disclosed herein are essentially built on the following two points:

Inner-loop power control (ILPC) restriction

E-DPDCH power offset reduction

These two features are addressed in detail in the following discussion.

Inner-Loop Power Control Restriction—

According to several of the presently disclosed techniques, the UE's inner-loop power control (ILPC) will only follow power control commands from the serving cell. There are several ways to accomplish this. For example, the non-serving cells may be configured by RNC commands or otherwise controlled to always send "UP" TPC commands, at least during scenarios of interest, thus ensuring that the ILPC operation of the UE is dictated by only the serving cell's commands. Another approach is to configure the UE's active set so that only the serving cell is included. With this approach, the UE will only monitor TPC commands from the serving cell, again ensuring that the ILPC operation of the UE is dictated by only the serving cell's commands. Still another approach is to modify the UE so that it ignores commands from non-serving cells, at least during scenarios of interest.

E-DPDCH Power Offset Reduction—

If the serving cell is allowed to dictate the ILPC during power-imbalance scenarios, the UE might create excessive interference towards non-serving cells, especially when the UL/DL imbalance is large. The reason for this is that the uplink path loss might be significantly less from the UE to a non-serving cell compared to the uplink path loss between the UE and the serving cell. One way to address this is to adjust the power offsets used for the E-DPDCH. This is effective because the E-DPDCH is especially power hungry, relative to other uplink channels. As a result, controlling the E-DPDCH power has an outsized impact on the total interference. Preferably, the E-DPDCH power offsets are controlled so as to ensure that the total E-DPDCH power remains roughly constant in the non-serving cell irrespectively of how severe the imbalance is.

This can be achieved by letting the network (e.g., the non-serving cell) control the reduction of the E-DPDCH power offsets. The appropriate reduction and update rate can be estimated by the controlling node. A few design options for handling the adjustments of the E-DPDCH power offsets follow:

One approach to deduce an appropriate E-DPDCH power offset reduction is to estimate the Downlink Physical Control Channel (DPCCH) signal-to-interference ratio (SIR) in the non-serving cell over a particular time period. Then, the reduction in E-DPDCH power offset is given by the estimated DPCCH SIR minus the DPCCH SIR target or a given DPCCH setpoint.

Different rates for how often the E-DPDCH power offset should be updated can be considered. Similarly, the degree of DPCCH SIR filtering can be set differently, in various embodiments or at different instances. A fast update rate will in general improve the performance, but is costly in terms of processing and signalling of power offsets. In most deployments, it is likely to be possible to use very seldom updates of the power offsets without compromising the performance significantly.

There might be a need to update the outer-loop power control (OLPC) mechanism, under some circumstances. If the serving grant is reduced, i.e., both E-DPDCH power offset and Transport Block Size (TBS) are reduced, for example, then it may be advisable to freeze the SIR target, thus disabling the OLPC. However, if only the E-DPDCH power offset is reduced, while the TBS remains roughly constant, then there might be no need to change the OLPC functionality. See below for further details on the different solutions discussed herein.

To change the power offset for E-DPDCH, the network needs to send the new values to the UE. Any one or more of several parameters may be used to communicate the information from the network to the UE:

One alternative is to assign new reference gain factors, which are derived from the quantized amplitude ratios Aed, which is translated from ΔE-DPDCH signaled by higher layers. Hence, a new ΔE-DPDCH would be signaled. Alternatively, an offset to the currently used ΔE-DPDCH, or Aed, is signaled. The benefit of giving new reference values is that the E-DPDCH power offset (beta_ed) is reduced, while the TBS remains the same. This results in reduced interference but has no impact on throughput. This also means that the outer-loop power control mechanism can remain unaffected.

Another alternative is to signal a reduction in the serving grant used by the UE to set the power offset and transport block size (TBS). This can be done using the existing E-DCH Relative Grant Channel (E-RGCH. A drawback with this approach is that a reduction in the serving grant will not only decrease the E-DPDCH power offset, but also the TBS, meaning that the uplink throughput is reduced.

A second question is how to signal the new information to the UE. Alternatives for this include, but are not limited to:

One solution is to use higher layer signaling, such as Radio Resource Control (RRC) signaling. As indicated above, ΔE-DPDCH is today signaled by higher layers (of which RRC is one), which makes this approach standard compliant. Another benefit of this approach is that all nodes will be informed of the new reference setting and there is no risk of inconsistency between the UE and nodes with respect to gain values.

Another solution is to introduce more dynamic Layer 1 (L1) signaling, e.g., using HS-SCCH orders, to convey the updated E-DPDCH power offset. For example, there could be orders for sending an incremental change to existing reference values or an absolute value.

One important aspect of the techniques disclosed herein is how and when to perform it, e.g. how to enable and disable the functionality. Options for controlling the functionality described above include, but are not limited to, the following:

One option is to let the network decide whether to enable the feature or not. The criteria for enabling or otherwise controlling the functionality described above may include, but are not limited to:

Enabling the feature whenever entering soft handover or whenever entering soft handover involving nodes of different transmit powers, where there is potentially a large imbalance between uplink and downlink.

Enabling the feature whenever the quality of one or more control channels, e.g., HS-DPCCH or E-DPCCH, becomes bad. Similarly, the quality of the E-DPDCH can be used as a trigger. For example, if the serving node continuously fails to decode data, it is an indication that the link is poor. Also, if the estimated SIR is (well) below the SIR target for some time, it is an indication that another node is handling the power control and the own link may be weak.

If a large link imbalance between the UE and the serving cell or the UE and any other non-serving cell is detected, then this function is enabled, and similarly the feature can be disabled if the links are more balanced. This functionality can be located in the RNC or in any NodeB. Another alternative would be to enable the feature in heterogeneous network deployments with inherently large UL/DL imbalances.

The functionality can be UE triggered. For example, the UE may notice that the serving cell (or any cell) is retransmitting too much, and hence deduce that the link towards that node is poor. Thus, in some embodiments a UE informs the RNC (via a new message) about this, and the RNC commands the UE to employ the new loop, and informs the NodeBs about its usage.

The network can decide/set user parameters for the scheme. For example, the network decides how often to update the E-DPDCH power offset, and how much filtering to use for obtaining average DPCCH SIR, etc.

If there are several non-serving cells, then it is preferred to let the best cell, meaning the cell with the best uplink quality, control the power offset reduction. Note that the ideas and techniques described above can be combined with each other. Also, these techniques are not only applicable to heterogeneous networks.

A major benefit of the disclosed techniques is that they can be used to protect all UL control information (HS-DPCCH, E-DPCCH or in-band E-DPDCH). Furthermore, most of the disclosed techniques are applicable to legacy users.

Figure 4:
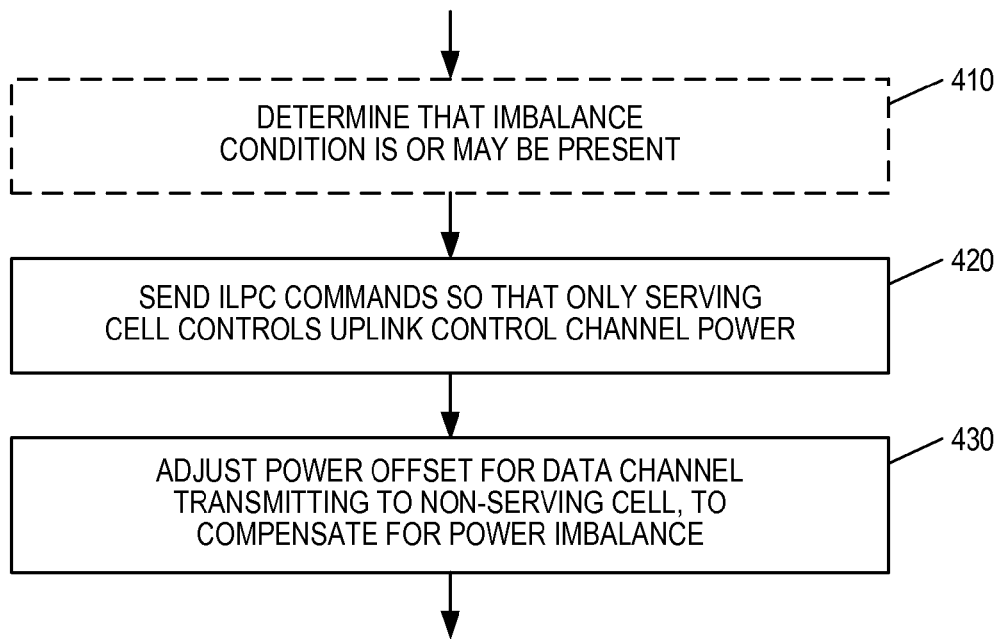
FIG. 4 is a process flow diagram illustrating an example method according to the presently disclosed techniques.

FIG. 4 is a process flow diagram illustrating an example method implemented in at least one network node of a wireless communication network serving a UE, where the UE is transmitting one or more uplink channels to each of a serving cell and at least one non-serving cell. The illustrated method may be carried out in a Radio Network Controller (RNC), for example, or in one or more base stations, or in a combination of an RNC and one or more base stations. It will be appreciated that the illustrated method and the variants discussed below represent example embodiments of the present techniques. Other variants and embodiments are possible, according to any practical combination of the various techniques described above.

As shown at block 410, the method in some embodiments may begin with first determining that a power-imbalance condition is or may be present, based on a triggering condition. In such embodiments, the subsequent operations are performed in response to said determined. This determining operation need not appear in all embodiments or take place in every instance, however. For this reason, block 410 is outline with a dashed outline, indicating that it is "optional" in the sense that it may not appear in every embodiments or in every instance that the method is carried out. Where this operation does appear, the triggering condition may comprise one or more of the following, for example: the UE has entered soft handover; the UE has entered soft handover involving cells having different transmit powers; one or more control channel qualities at the serving cell becomes bad, compared to a predetermined reference level; a data channel quality at the serving cell becomes bad, compared to a predetermined reference level; the estimated SIR at the serving cell is below the SIR target for longer than a predetermined period of time; a large link imbalance between the UE and the serving cell and the UE and the at least one non-serving cell is detected; and the UE sends a message to the network, the message indicating a link imbalance.

As shown at block 420, the illustrated method continues with the sending of inner-loop power control (ILPC) commands to the UE in such a way that only ILPC commands transmitted by the serving cell affect the power of one or more control channels transmitted by the UE to the serving cell. As discussed above, this may be done in any of several different ways. For example, the sending of ILPC commands to the UE may comprise sending only "UP" Transmit Power Control (TPC) commands to the UE from the at least one non-serving cell, while selectively sending "UP" and "DOWN" TPC commands to the UE from the serving cell to control the power of one or more control channels transmitted by the UE to the serving cell. In another example, the sending of ILPC commands to the UE comprises configuring an active set for the UE to include only the serving cell, so that an ILPC function in the UE responds only to TPC commands transmitted by the serving cell. In still another example, the sending of ILPC commands to the UE comprises configuring the UE to ignore TPC commands transmitted by the at least one non-serving cell. It will be appreciated that one or more of the operations illustrated in FIG. 4 may be implemented at least partly in a Radio Network Controller (RNC). In such a case, the sending of ILPC commands to the UE may include controlling the serving cell and/or at least one non-serving cell to send the ILPC commands in such a way that only ILPC commands transmitted by the serving cell affect the power of one or more control channels transmitted by the UE to the serving cell.

As shown at block 430, the method continues with adjusting a power offset for a data channel transmitted by the UE to the at least one non-serving cell so as to compensate for an uplink-downlink power imbalance among the serving cell and the at least one non-serving cell. This may comprise, for example, adjusting a power offset for a data channel transmitted by the UE comprises adjusting a power offset for an uplink packet data channel. The uplink packet data channel in such embodiments may be an E-DCH Dedicated Physical Data Channel (E-DPDCH), for instance. In some embodiments, adjusting the power offset for the data channel transmitted by the UE comprises estimating a signal-to-interference ratio (SIR), signal-to-interference-plus-noise ratio (SINR), or other signal quality measure for an uplink control channel in the at least one non-serving cell and calculating the power offset based on a difference between the estimated signal quality measure and a control channel target or setpoint for the signal quality measure. In any of these or in other embodiments, the power offset may be sent to the UE via a new reference gain factor or via a change in a serving grant, for example. The power offset may be sent using RLC or RRC signaling, in some embodiments, or using physical layer (L1) signaling, such as a via an HS-SCCH order, in others.

Although the described solutions may be implemented in any appropriate type of telecommunication system supporting any suitable communication standards and using any suitable components, network-based embodiments of the described solutions may be implemented in one or more nodes of a radio access network (RAN), such as a node in a 3GPP UMTS network. These nodes include, but are not limited to, a base station or RNC in a UMTS network.

Figure 5:
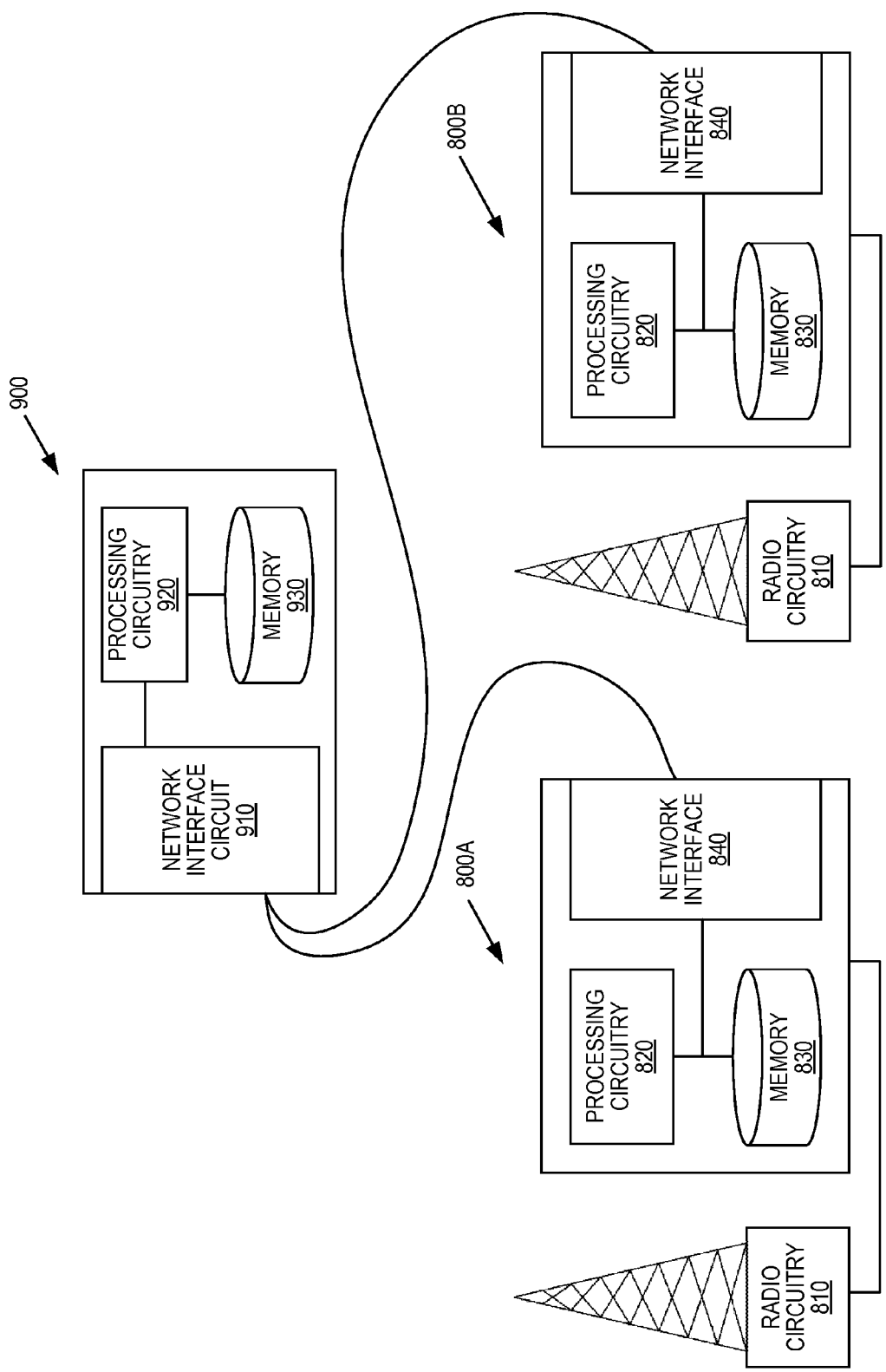
FIG. 5 is a block diagram illustrating components of a wireless communication system, including a radio network controller (RNC), a serving base station, and a non-serving base station.

FIG. 5 illustrates several network nodes that may implement or be involved in carrying out one or more of the techniques described above, including a radio network controller (RNC) 900, a first radio base station 800A, and second radio base station 800B. One of the radio base stations 800A and 800B may be an LPN while the other is a macro node, for example. The network in which these techniques are implemented may further include any additional elements suitable to support communication between wireless devices or between a wireless device and another communication device (such as a landline telephone). Although the illustrated network nodes may represent a network communication device that includes any suitable combination of hardware and/or software, these network nodes may, in particular embodiments, represent a device such as the example network node 900 shown in FIG. 5. Similarly, although the illustrated base station nodes 800A and 800B may represent network nodes that include any suitable combination of hardware and/or software, these network nodes may, in particular embodiments, represent devices having the particular configurations shown in FIG. 5, or equivalents thereto.

As shown in FIG. 5, the example network node 900 includes processing circuitry 920, a memory 930, and network interface circuitry 910. In particular embodiments, some or all of the functionality described above as being provided by an RNC or similar network node, for example, may be provided by the processing circuitry 920 executing instructions stored on a computer-readable medium, such as the memory 930 shown in FIG. 5. Alternative embodiments of the network node 900 may include additional components beyond those shown in FIG. 5, which components may be responsible for providing certain aspects of the node's functionality, including any of the functionality described above and/or any functionality necessary to support the solutions described above.

The example base stations 800A and 800B each include processing circuitry 820, a memory 830, radio circuitry 810, and at least one antenna. The processing circuitry 820 may comprise RF circuitry and baseband processing circuitry (not shown). In particular embodiments, some or all of the functionality described above as being provided by a base station, such as a NodeB in a UMTS system, may be provided by the processing circuitry 820 executing instructions stored on a computer-readable medium, such as the memory 830 shown in FIG. 5. Alternative embodiments of base stations 800A and/or 800B may include additional components responsible for providing additional functionality, including any of the functionality identified above and/or any functionality necessary to support the solution described above.

Terminal-based techniques and methods that complement the above-described methods are also possible, and may be implemented using radio circuitry and electronic data processing circuitry provided in a terminal. A generalized method that may be carried out in a wireless device is illustrated in FIG. 6, while FIG. 7 illustrates components of an example wireless device apparatus.

Figure 6:
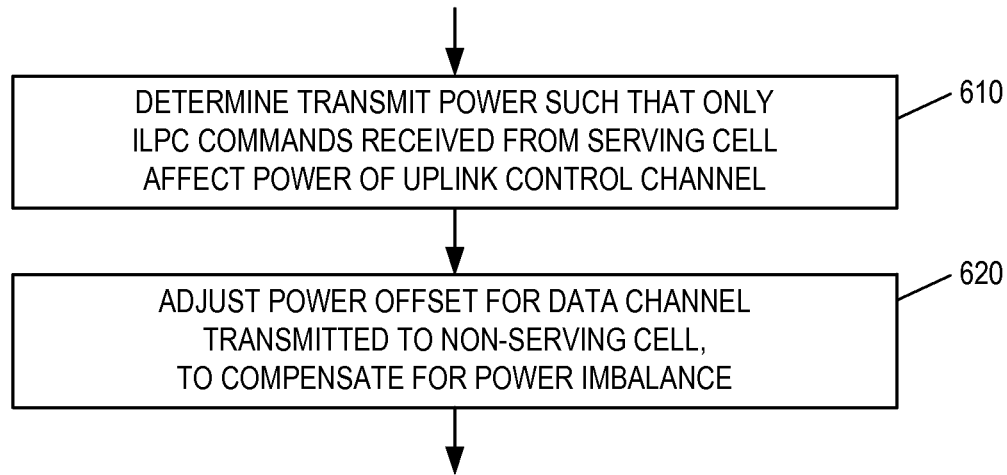
FIG. 6 is a process flow diagram illustrating another example method according to the presently disclosed techniques.
Figure 7:
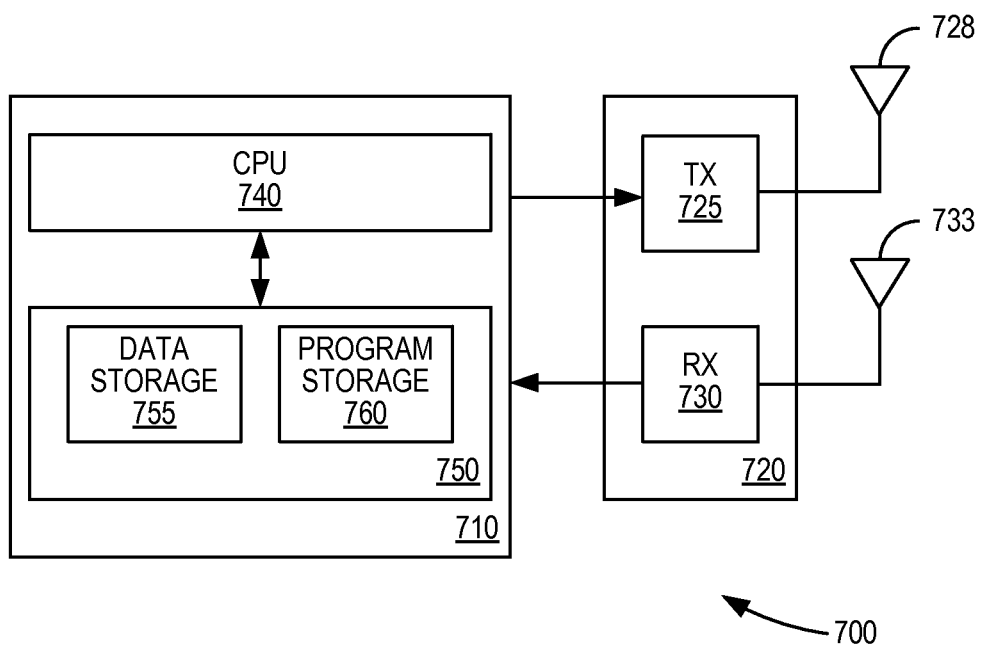
FIG. 7 is a block diagram illustrating components of an example wireless device.

Referring first to FIG. 6, the illustrated method includes, as shown at block 610, with determining transmit power for a control channel to a serving cell in such a way that only ILPC commands received by the serving cell affect the power of the control channel. In some embodiments or in some instances, this is done by using an active set that has been configured so as to include only the serving cell, so that an ILPC function in the wireless device responds only to TPC commands transmitted by the serving cell. In other embodiments or in other instances, this is done by receiving only "UP" TPC commands from a non-serving cell or cells, while receiving both "UP" and "DOWN" TPC commands from the serving cell. In this scenario, the commands received from the serving cell will control the power of the control channel or channels transmitted by the wireless device.

In other embodiments or instances, the wireless device is specifically configured to ignore TPC commands transmitted by a non-serving cell or cells. In these embodiments, the active set may include one or more non-serving cell or cells, but the TPC commands from those non-serving cells are nevertheless ignored by the wireless device. This configuration may be performed in several ways—in one example, the wireless device receives configuration information from the network indicating that the TPC commands from non-serving cells should be ignored. This configuring may be based on Layer 1 signaling, for example, such as by an HS-SCCH order. In some embodiments, the wireless device may be configured to recognize that it is in an uplink/downlink scenario, and to ignore TPC commands from non-serving cells in response to that recognition.

As shown at block 620, the method further includes adjusting a power offset for a data channel transmitted by the wireless device. This adjusting may be in response to signaling from the network; several techniques for signaling the adjustment to the wireless device were discussed in detail above.

FIG. 7 illustrates features of an example terminal 700 according to several embodiments of the present techniques. Terminal 700, which may be a UE configured for operation with a 3GPP WCDMA network and that also supports Wi-Fi, for example, comprises a transceiver unit 720 for communicating with one or more base stations as well as a processing circuit 710 for processing the signals transmitted and received by the transceiver unit 720. Transceiver unit 720 includes a transmitter 725 coupled to one or more transmit antennas 728 and receiver 730 coupled to one or more receiver antennas 733. The same antenna(s) 728 and 733 may be used for both transmission and reception. Receiver 730 and transmitter 725 use known radio processing and signal processing components and techniques, typically according to a particular telecommunications standard such as the 3GPP standards for WCDMA. Note also that transmitter unit 720 may comprise separate radio and/or baseband circuitry for each of two or more different types of radio access network, such as radio/baseband circuitry adapted for UMTS operation and separate radio/baseband circuitry adapted for WiFi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques, additional details are not shown here. Processing circuit 710 comprises one or more processors 740 coupled to one or more memory devices 750 that make up a data storage memory 755 and a program storage memory 760. Processor 740, identified as CPU 740 in FIG. 7, may be a microprocessor, microcontroller, or digital signal processor, in some embodiments. More generally, processing circuit 710 may comprise a processor/firmware combination, or specialized digital hardware, or a combination thereof. Memory 750 may comprise one or several types of memory such as read-only memory (ROM), random-access memory, cache memory, flash memory devices, optical storage devices, etc. Because terminal 700 supports multiple radio access networks, processing circuit 710 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 710 include modulation and coding of transmitted signals and the demodulation and decoding of received signals. In several embodiments of the present invention, processing circuit 710 is adapted, using suitable program code stored in program storage memory 760, for example, to carry out one of the techniques described above in connection with FIG. 6. Thus, for example, processing circuit 710 may be adapted, via suitable program code in memory 760, to determine transmit power for a control channel to a serving cell in such a way that only ILPC commands received by the serving cell affect the power of the control channel, and to adjust a power offset for a data channel transmitted by the wireless device. Of course, it will be appreciated that not all of the steps of these techniques are necessarily performed in a single microprocessor or even in a single module.

In several embodiments of the present invention, a processing circuit is adapted, using suitable program code stored in memory, for example, to carry out one or more of the techniques described above, including any of the methods discussed in connection with FIGS. 4 and 6. Of course, it will be appreciated that not all of the steps of these techniques are necessarily performed in a single microprocessor or even in a single module. It further will be appreciated that a processing circuit, as adapted with program code stored in memory, can implement the process flow of FIG. 4 or 6, or variants thereof, using an arrangement of functional "modules," where the modules are computer programs or portions of computer programs executing on the processor circuit. Accordingly, any of the apparatus described above, whether forming all or part of a mobile terminal apparatus or a base station apparatus, can be understood as comprising one or more functional modules implemented with processing circuitry.

It will be recognized by the person of skill in the art that various modifications may be made to the above described embodiments without departing from the scope of the present invention. For example, although embodiments of the present invention have been described with examples that include a communication system compliant to the 3GPP standards for UMTS, it should be noted that the solutions presented may be applicable to other 3GPP specified technologies or to non-3GPP wireless communications networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, implemented in at least one network node of a wireless communication network serving a wireless device, wherein the wireless device is transmitting one or more uplink channels to each of a serving cell and at least one non-serving cell, the method comprising:

sending inner-loop power control (ILPC) commands to the wireless device in such a way that only ILPC commands transmitted by the serving cell affect the power of one or more control channels transmitted by the wireless device to the serving cell;

updating a data-channel power offset for a data channel transmitted by the wireless device to the at least one non-serving cell so as to compensate for an uplink-downlink power imbalance among the serving cell and the at least one non-serving cell, wherein the updated data-channel power offset controls a reduction in the power transmitted by the wireless device on the data channel relative to the power transmitted by the wireless device on the one or more control channels; and signaling the updated data-channel power offset to the wireless device.

2. The method of claim 1, wherein said sending of ILPC commands to the wireless device comprises sending only "UP" Transmit Power Control (TPC) commands to the wireless device from the at least one non-serving cell, while selectively sending "UP" and "DOWN" TPC commands to the wireless device from the serving cell to control the power of one or more control channels transmitted by the wireless device to the serving cell.

3. The method of claim 1, wherein said sending of ILPC commands to the wireless device comprises configuring an active set for the wireless device to include only the serving cell, so that an ILPC function in the wireless device responds only to Transmit Power Control (TPC) commands transmitted by the serving cell.

4. The method of claim 1, wherein said sending of ILPC commands to the wireless device comprises configuring the wireless device to ignore Transmit Power Control (TPC) commands transmitted by the at least one non-serving cell.

5. The method of claim 1, wherein said method is implemented at least partly in a Radio Network Controller (RNC) and wherein said sending of ILPC commands to the wireless device comprises controlling the serving cell and/or at least one non-serving cell to send the ILPC commands in such a way that only ILPC commands transmitted by the serving cell affect the power of one or more control channels transmitted by the wireless device to the serving cell.

6. The method of claim 1, wherein updating a data-channel power offset for a data channel transmitted by the wireless device comprises adjusting a power offset for an uplink packet data channel.

7. The method of claim 6, wherein the uplink packet data channel is an E-DCH Dedicated Physical Data Channel (E-DPDCH).

8. The method of claim 1, wherein updating a data-channel power offset for a data channel transmitted by the wireless device comprises estimating a signal-to-interference ratio (SIR) for an uplink control channel in the at least one non-serving cell and calculating the data-channel power offset based on a difference between the estimated SIR and a control channel SIR target or setpoint.

9. The method of claim 1, wherein signaling the updated data-channel power offset to the wireless device comprises sending the data-channel power offset to the wireless device via a new reference gain factor.

10. The method of claim 1, wherein signaling the updated data-channel power offset to the wireless device comprises sending the data-channel power offset to the wireless device via a change in a serving grant.

11. The method of claim 1, wherein signaling the updated data-channel power offset to the wireless device comprises sending the data-channel power offset to the wireless device using Radio Resource Control (RRC) signaling.

12. The method of claim 1, wherein signaling the updated data-channel power offset to the wireless device comprises sending the data-channel power offset to the wireless device using physical layer signaling.

13. The method of claim 12, wherein sending the data-channel power offset to the wireless device using physical layer signaling comprises sending the data-channel power offset in a high-speed shared control channel (HS-SCCH) order.

14. The method of claim 1, further comprising first determining that a power-imbalance condition is or may be present, based on a triggering condition, wherein said sending of ILPC commands and updating the data-channel power offset for the data channel are performed in response to said determining.

15. The method of claim 14, wherein said triggering condition comprises one or more of the following:
the wireless device has entered soft handover;
the wireless device has entered soft handover involving cells having different transmit powers;
one or more control channel qualities at the serving cell becomes bad, compared to a predetermined reference level;
a data channel quality at the serving cell becomes bad, compared to a predetermined reference level;
the estimated SIR at the serving cell is below the SIR target for longer than a predetermined period of time;
a large link imbalance between the wireless device and the serving cell and the wireless device and the at least one non-serving cell is detected;
the wireless device sends a message to the network, the message indicating a link imbalance.

16. A network node apparatus comprising:
a radio transceiver associated with a first cell and configured to communicate with one or more wireless devices served by the first cell; and
one or more processing circuits configured to:
configure a wireless device that is transmitting one or more uplink channels to the first cell and to at least one non-serving cell to respond to inner-loop power control (ILPC) commands sent to the wireless device in such a way that only ILPC commands transmitted by the first cell affect the power of one or more control channels transmitted by the wireless device to the first cell;
update a data-channel power offset for a data channel transmitted by the wireless device to the at least one non-serving cell so as to compensate for an uplink-downlink power imbalance among the first cell and the at least one non-serving cell, wherein the updated data-channel power offset controls a reduction in the power transmitted by the wireless device on the data channel relative to the power transmitted by the wireless device on the one or more control channels; and
signal the updated data-channel power offset to the wireless device.

17. The network node apparatus of claim 16, wherein the one or more processing circuits are configured to configure an active set for the wireless device to include only the first cell, so that an ILPC function in the wireless device responds only to Transmit Power Control (TPC) commands transmitted by the first cell.

18. The network node apparatus of claim 16, wherein the one or more processing circuits are configured to configure the wireless device to ignore Transmit Power Control (TPC) commands transmitted by the at least one non-serving cell.

19. The network node apparatus of claim 16, wherein the one or more processing circuits are configured to update a data-channel power offset for a data channel transmitted by the wireless device by adjusting a power offset for an uplink packet data channel.

20. The network node apparatus of claim 19, wherein the uplink packet data channel is an E-DCH Dedicated Physical Data Channel (E-DPDCH).

21. The network node apparatus of claim 16, wherein the one or more processing circuits are configured to update a data-channel power offset for a data channel transmitted by the wireless device by estimating a signal-to-interference ratio (SIR) for an uplink control channel in the at least one non-serving cell and calculating the data-channel power offset based on a difference between the estimated SIR and a control channel SIR target or setpoint.

22. The network node apparatus of claim 16, wherein the one or more processing circuits are configured to update a data-channel power offset for a data channel transmitted by the wireless device by sending the data-channel power offset to the wireless device via a new reference gain factor.

23. The network node apparatus of claim 16, wherein the one or more processing circuits are configured to update a data-channel power offset for a data channel transmitted by the wireless device by sending the data-channel power offset to the wireless device via a change in a serving grant.

24. The network node apparatus of claim 16, wherein the one or more processing circuits are configured to update a data-channel power offset for a data channel transmitted by the wireless device by sending the data-channel power offset to the wireless device using Radio Resource Control (RRC) signaling.

25. The network node apparatus of claim 16, wherein the one or more processing circuits are configured to update a data-channel power offset for a data channel transmitted by the wireless device by sending the data-channel power offset to the wireless device using physical layer signaling.

26. The network node apparatus of claim 25, wherein the one or more processing circuits are configured to send the data-channel power offset in a high-speed shared control channel (HS-SCCH) order.

27. The network node apparatus of claim 16, wherein the one or more processing circuits are further configured to first determine that a power-imbalance condition is or may be present, based on a triggering condition, and to perform said configuring the wireless device to respond to ILPC commands and said updating a data-channel power offset for a data channel in response to said determining.

28. The network node apparatus of claim 27, wherein said triggering condition comprises one or more of the following:
the wireless device has entered soft handover;
the wireless device has entered soft handover involving cells having different transmit powers;
one or more control channel qualities at the serving cell becomes bad, compared to a predetermined reference level;
a data channel quality at the serving cell becomes bad, compared to a predetermined reference level;
the estimated SIR at the serving cell is below the SIR target for longer than a predetermined period of time;
a large link imbalance between the wireless device and the serving cell and the wireless device and the at least one non-serving cell is detected;

the wireless device sends a message to the network, the message indicating a link imbalance.

29. A wireless communication system comprising:

a serving cell transceiver associated with a serving cell and configured to receive at least one uplink channel from a wireless device served by the serving cell;

one or more non-serving cell transceivers, each associated with a non-serving cell and configured to receive at least one uplink channel from the wireless device, simultaneously with said serving cell transceiver receiving an uplink channel from the wireless device; and one or more processing circuits associated with one or more of the serving cell transceiver, the one or more non-serving cell transceivers, and a radio network controller, wherein the one or more processing circuits are configured to:

control the serving cell transceiver and the one or more non-serving cell transceivers to send inner-loop power control (ILPC) commands to the wireless device in such a way that only ILPC commands transmitted by the serving cell affect the power of one or more control channels transmitted by the wireless device to the serving cell; and update a data-channel power offset for a data channel transmitted by the wireless device to the at least one non-serving cell so as to compensate for an uplink-downlink power imbalance among the serving cell and the at least one non-serving cell, wherein the updated data-channel power offset controls a reduction in the power transmitted by the wireless device on the data channel relative to the power transmitted by the wireless device on the one or more control channels; and signal the updated data-channel power offset to the wireless device.

30. The wireless communication system of claim 29, wherein the processing circuits are configured to control the one or more non-serving cell transceivers to send only "UP" Transmit Power Control (TPC) commands to the wireless device from the at least one non-serving cell, and to control the serving cell transceiver to send "UP" and "DOWN" TPC commands to the wireless device from the serving cell to control the power of one or more control channels transmitted by the wireless device to the serving cell.

31. The wireless communication system of claim 29, wherein the processing circuits are configured to configure an active set for the wireless device to include only the serving cell, so that an ILPC function in the wireless device responds only to Transmit Power Control (TPC) commands transmitted by the serving cell.

32. The wireless communication system of claim 29, wherein the processing circuits are configured to configure the wireless device to ignore Transmit Power Control (TPC) commands transmitted by the at least one non-serving cell.

33. The wireless communication system of claim 29, wherein the processing circuits are configured to update a data-channel power offset for a data channel transmitted by the wireless device by adjusting a power offset for an uplink packet data channel.

34. The wireless communication system of claim 29, wherein the processing circuits are further configured to first determine that a power-imbalance condition is or may be present, based on a triggering condition, and to perform said controlling of the serving cell transceiver and the one or more non-serving cell transceivers and said updating of the data-channel power offset in response to said determining.

* * * * *